(12) United States Patent
Sugawara et al.

(10) Patent No.: US 8,478,138 B2
(45) Date of Patent: Jul. 2, 2013

(54) OPTICAL RECEIVING DEVICE, OPTICAL RECEIVING CIRCUIT, AND METHOD FOR RECEIVING OPTICAL SIGNALS

(75) Inventors: Mariko Sugawara, Kawasaki (JP); Yukito Tsunoda, Kawasaki (JP); Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 424 days.

(21) Appl. No.: 12/623,548

(22) Filed: Nov. 23, 2009

(65) Prior Publication Data

US 2010/0135678 A1 Jun. 3, 2010

(30) Foreign Application Priority Data

Nov. 28, 2008 (JP) ................................. 2008-305656

(51) Int. Cl.
*H04B 10/06* (2006.01)
(52) U.S. Cl.
USPC ........................... 398/210; 398/202; 398/208
(58) Field of Classification Search
USPC ................................................ 398/210, 208
See application file for complete search history.

(56) References Cited

U.S. PATENT DOCUMENTS

| | | | | |
|---|---|---|---|---|
| 6,151,150 A * | 11/2000 | Kikuchi | ........................ | 398/209 |
| 6,181,454 B1 * | 1/2001 | Nagahori et al. | ............. | 398/210 |
| 6,525,858 B1 * | 2/2003 | Nagahori | ....................... | 398/208 |
| 6,587,004 B2 * | 7/2003 | Ide | ................. | 330/308 |
| 6,707,497 B1 * | 3/2004 | Pantigny et al. | ............... | 348/310 |
| 6,907,202 B1 * | 6/2005 | Ide et al. | ........................ | 398/208 |
| 7,196,310 B2 * | 3/2007 | Nakamoto et al. | ......... | 250/214 A |
| 7,200,344 B1 * | 4/2007 | Hoshida | ......................... | 398/202 |
| 7,405,386 B2 * | 7/2008 | Shimizu et al. | ............ | 250/214 R |
| 7,450,863 B2 * | 11/2008 | Winzer | .......................... | 398/204 |
| 7,477,852 B2 * | 1/2009 | Agarwal et al. | ................ | 398/210 |
| 7,734,196 B2 * | 6/2010 | Takahara | ....................... | 398/208 |
| 7,860,394 B2 * | 12/2010 | Hoshida | ........................... | 398/74 |
| 7,949,260 B2 * | 5/2011 | Fukuchi | ......................... | 398/202 |
| 7,991,300 B2 * | 8/2011 | Heffner et al. | ................ | 398/202 |
| 7,995,929 B2 * | 8/2011 | Webb et al. | .................... | 398/208 |
| 8,023,832 B2 * | 9/2011 | Mizuno et al. | ................. | 398/202 |
| 8,055,139 B2 * | 11/2011 | Noya et al. | ..................... | 398/210 |
| 8,121,494 B2 * | 2/2012 | Andrew et al. | ................ | 398/202 |
| 8,135,279 B2 * | 3/2012 | Mertz | .............................. | 398/76 |
| 8,145,071 B2 * | 3/2012 | Tanaka et al. | .................. | 398/209 |
| 8,145,072 B2 * | 3/2012 | Akiyama et al. | .............. | 398/213 |
| 8,260,136 B2 * | 9/2012 | Nagarajan et al. | .............. | 398/74 |
| 8,270,847 B2 * | 9/2012 | Zhang et al. | ................... | 398/183 |

(Continued)

FOREIGN PATENT DOCUMENTS

JP 11-004196 1/1999

*Primary Examiner* — Kenneth N Vanderpuye
*Assistant Examiner* — Amritbir Sandhu
(74) *Attorney, Agent, or Firm* — Staas & Halsey LLP (57) ABSTRACT

There is provided an optical receiving device for deriving a signal using for data identification. The optical receiving device includes a demodulator for demodulating a modulated optical signal to an demodulated optical signal, a convertor for converting the demodulated optical signal to a first and a second electric signals, a generator for generating a complement signal by summing the first electric signal of a normal in phase component and the second electric signal of a reverse in phase component, and a suppressor for suppressing, by the use of the complement signal, a variation of potential which appears in a data signal at a time of phase changing of the modulated optical signal, the data signal being a difference of the normal in phase component and the reverse in phase component.

15 Claims, 8 Drawing Sheets

U.S. PATENT DOCUMENTS

| | | | |
|---|---|---|---|
| 8,285,152 B2* | 10/2012 | Akiyama et al. | 398/202 |
| 8,299,417 B2* | 10/2012 | Nagarajan | 250/227.11 |
| 2002/0153958 A1* | 10/2002 | Ide | 330/308 |
| 2005/0069333 A1* | 3/2005 | Moeller | 398/202 |
| 2006/0171718 A1* | 8/2006 | Hoshida | 398/152 |
| 2008/0019463 A1* | 1/2008 | Ikeuchi et al. | 375/331 |
| 2008/0240738 A1* | 10/2008 | Katagiri | 398/202 |
| 2009/0034967 A1* | 2/2009 | Tao et al. | 398/33 |
| 2009/0034989 A1* | 2/2009 | Hayashi et al. | 398/208 |
| 2009/0074428 A1* | 3/2009 | Liu | 398/208 |
| 2009/0116844 A1* | 5/2009 | Tanaka et al. | 398/115 |
| 2009/0129788 A1* | 5/2009 | Seimetz | 398/208 |
| 2009/0142075 A1* | 6/2009 | Akiyama et al. | 398/202 |
| 2009/0238579 A1* | 9/2009 | Rahn et al. | 398/152 |
| 2009/0257758 A1* | 10/2009 | Sasaki | 398/214 |
| 2009/0290876 A1* | 11/2009 | Fukuchi et al. | 398/79 |
| 2010/0040383 A1* | 2/2010 | Hironishi et al. | 398/208 |
| 2010/0080560 A1* | 4/2010 | Mertz | 398/76 |
| 2010/0092185 A1* | 4/2010 | Nemoto | 398/208 |
| 2010/0150568 A1* | 6/2010 | Lee et al. | 398/137 |
| 2010/0322628 A1* | 12/2010 | Nagarajan et al. | 398/65 |
| 2012/0020676 A1* | 1/2012 | Chung et al. | 398/202 |
| 2012/0141145 A1* | 6/2012 | Akiyama et al. | 398/210 |
| 2012/0213532 A1* | 8/2012 | Hironishi et al. | 398/208 |

* cited by examiner

OPTICAL RECEIVING DEVICE, OPTICAL RECEIVING CIRCUIT, AND METHOD FOR RECEIVING OPTICAL SIGNALS

CROSS-REFERENCE TO RELATED APPLICATION

This application is based upon and claims the benefit of priority of the prior Japanese Patent Application No. 2008-305656, filed on Nov. 28, 2008, the entire contents of which are incorporated herein by reference.

FIELD

The embodiments discussed herein are related to an optical receiving device, an optical receiving circuit, and a method for receiving optical signals.

BACKGROUND

In these years, photonic networks for a large capacity communication are building for practicing the next generation network (NGN) which needs an optical transmission system capable of fast transmission. For the fast optical transmission, it will be necessary to adopt a modulation scheme which is able to convert effectively electrical signals to optical signals. The differential phase shift-keying scheme is receiving attention as a superior sensitivity modulation scheme.

Figure 7:
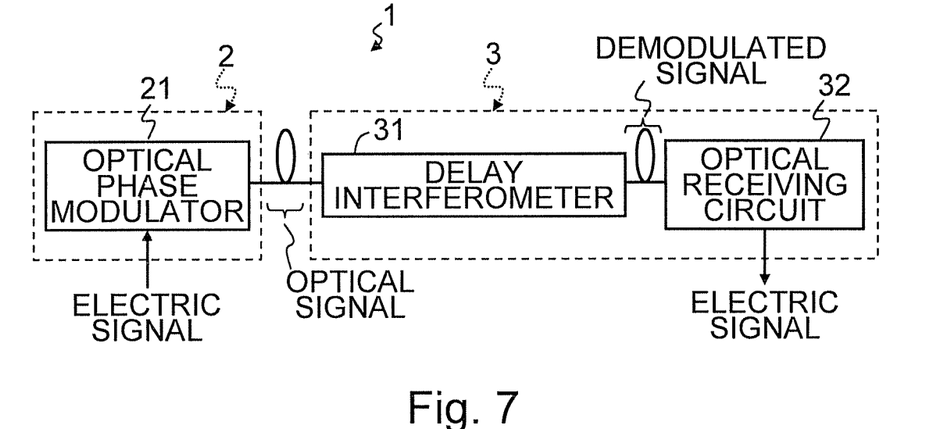
FIG. 7 is a diagram illustrating a configuration of a conventional optical transmission system using a phase modulation method.

Referring to FIG. 7, a conventional optical transmission system using a phase modulation scheme is explained. FIG. 7 illustrates schematically a configuration of the conventional optical transmission system 1 with a phase modulation scheme. The conventional optical transmission system 1 includes an optical transmitter 2 and an optical receiver 3. The optical transmitter 2 includes an optical phase modulator 21 which performs a conversion from an electric signal to an optical signal and a phase modulation of the optical signal, and transmits the phase-modulated optical signal to the optical receiver. The optical signal which is phase-modulated by the optical phase modulator 21 is hereinafter referred to as "a DPSK optical signal."

Figure 8:
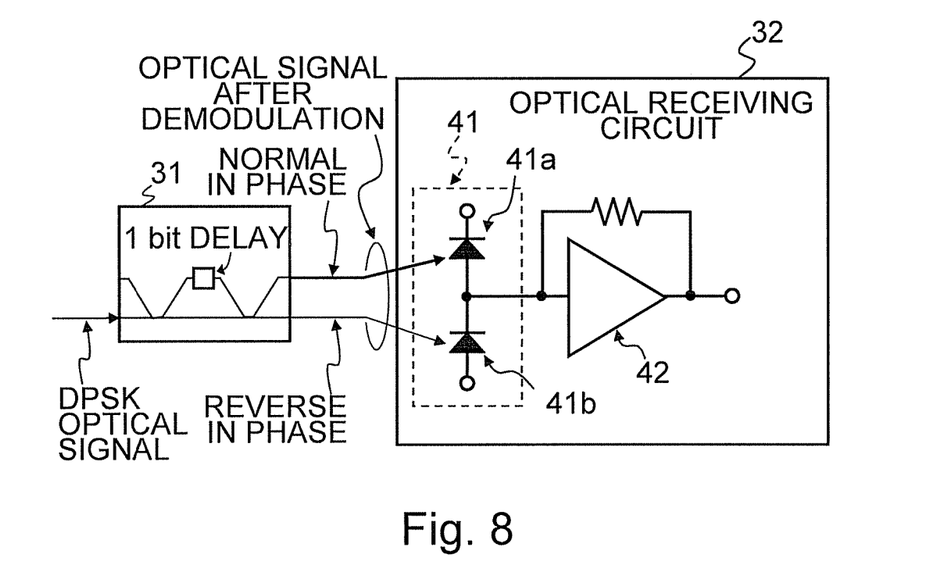
FIG. 8 is a diagram illustrating a delay interferometer and an optical receiving circuit used in an optical receiving device of the conventional optical transmission system illustrated in FIG. 7.

The optical receiver includes a delay interferometer 31 and an optical receiving circuit 32 which are illustrated in detail in FIG. 8. The delay interferometer 31 compares the DPSK optical signal received from the optical phase modulator 21 with an optical signal which is derived from the DPSK optical signal delayed by one bit to demodulate the DPSK optical signal. The delay interferometer 31 outputs, to the optical receiving circuit 32, a normal in phase and a reverse in phase components of the optical signal demodulated. The normal in phase component and the reverse in phase component are hereinafter referred to as the normal in phase optical signal and the reverse optical phase signal, respectively.

The optical receiving circuit includes a photo-detector 41, which is also referred to as a photo-detector and hereinafter abbreviated as PD, and an amplifier 42. The PD 41 comprises PDs 41a and 41b. The PD 41a converts the normal in phase optical signal to a corresponding electric signal and the PD 41b converts the reverse in phase optical signal to a corresponding electric signal. The PD 41 outputs, to the amplifier 42, a difference value of the normal and the reverse in phase signals. The difference value is amplified by the amplifier 42 and fed to a device or a circuit which is referred to as a data indentifying device and not shown in FIG. 8.

The data-identifying device determines data, which is corresponding to data sent from the optical transmitter 2, based on the received difference value from the amplifier 42. The data-identifying device determines, as example, the data being "1" when the received difference value is larger than the predetermined value and the data being "0" when the received difference value is smaller or equal to than the predetermined value. A conventional optical transmission system using DPSK optical signal is, for example, disclosed in Japanese Laid-open Patent Publication No. 11-4196.

SUMMARY

According to an aspect of the invention, there is provided an optical receiving device for deriving a signal using for data identification. The optical receiving device includes a demodulator for demodulating a modulated optical signal to an demodulated optical signal, a convertor for converting the demodulated optical signal to a first electric signal and a second electric signal, a generator for generating a complement signal by summing the first electric signal of a normal in phase component and the second electric signal of a reverse in phase component, and a suppressor for suppressing, by the use of the complement signal, a variation of potential in a data signal which appears at a time of phase changing of the modulated optical signal, the data signal being a difference of the first electric signal of the normal in phase component and the second electric signal of the reverse in phase component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However the conventional optical transmission system might have a possibility of erroneous determination of the data. The reason of the possibility will be described in detail below, referring to FIGS. 9 to 11B. For the sake of a concise explanation, it is assumed that the demodulation processing in the optical transmission system as an example is performed based on comparison of the optical signal with a delayed optical which is delayed by one or smaller bit behind the optical signal.

Figure 9:
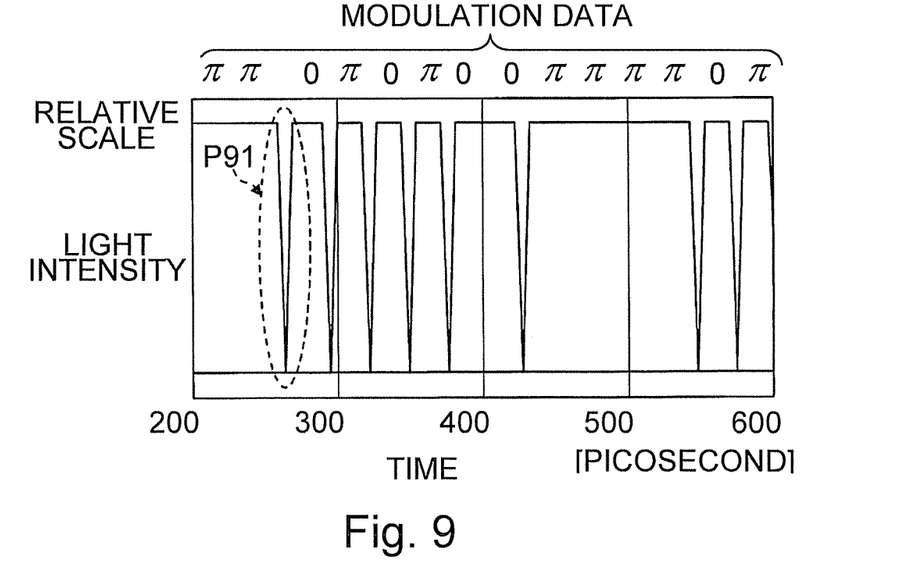
FIG. 9 is a diagram illustrating a phase modulated optical signal.

FIG. 9 is a diagram illustrating an example of change of intensity of an optical signal which is phase-modulated, where the horizontal axis represents time in picoseconds and the vertical axis represent intensity of the optical signal in arbitrary unit. FIG. 9 depicts the characteristic that the intensity of the optical signal falls, for example, to zero level at every time the phase changes. Incidentally, the intensity in a region P91 circled by a dotted line, as example, falls at the time corresponding to the phase change π to zero. At every time of the phase change such as π to 0 or 0 to π of the modulation data in FIG. 9, the intensity of the optical signal falls to 0 level other than the region P91.

Figure 10:
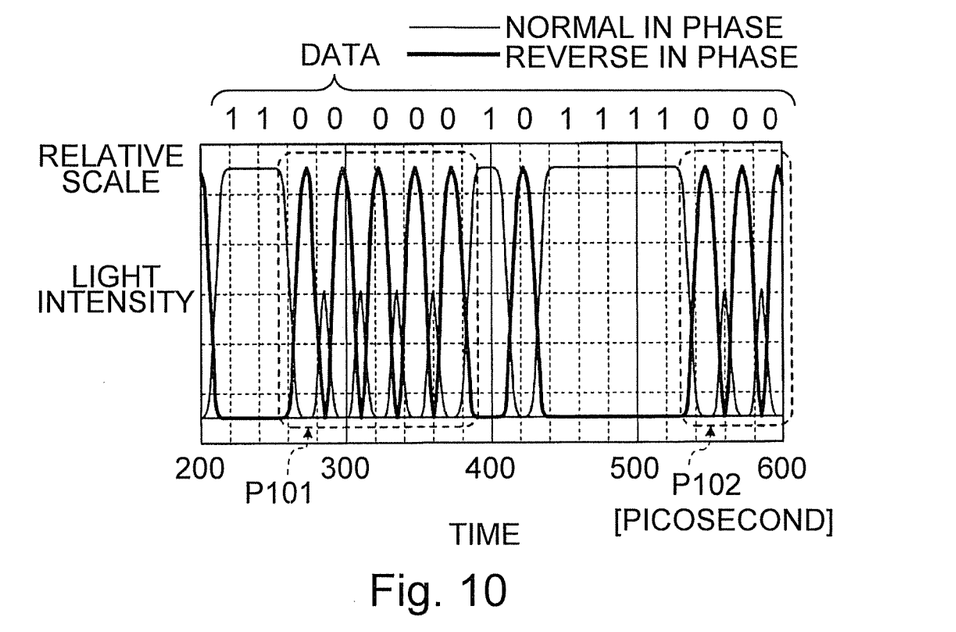
FIG. 10 is a diagram illustrating an optical signal demodulated by the delay interferometer illustrated in FIG. 8.

The delay interferometer 31 demodulates the optical signal having the characteristic described above. An example of an optical signal demodulated by the delay interferometer 31 is illustrated in FIG. 10, where the light solid line and the heavy solid line illustrate the normal in phase and the reverse in phase optical signals respectively. Referring to the regions P101 and P102 circled by dotted lines, intensity of the normal in phase and of the reverse in phase optical signals is individually changing at every change of the phase due to the characteristic of the optical signal described above and illustrated in FIG. 9. The intensity of the both optical signals in each circle in FIG. 10 is preferable or ideal to be a steady value.

The optical receiving circuit 32 converts the optical signals having such a variation to the corresponding electric signals and feeds them to the data-identifying circuit. The exemplary output signal of the conventional optical receiving circuit 32 is illustrated in FIG. 11A and the eye pattern or eye diagram concerning to the exemplary output signal is illustrated in FIG. 11B.

Figure 11A:
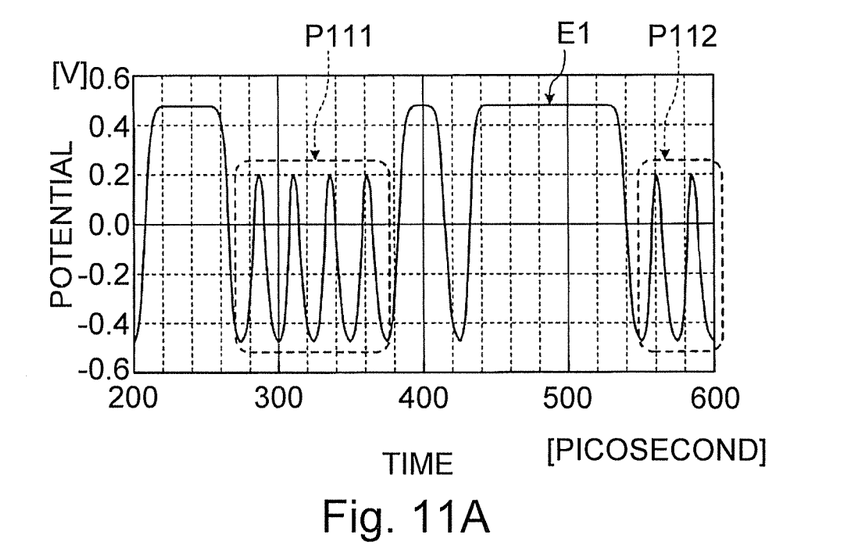
FIG. 11A is a diagram of an electric signal outputted from the optical receiving circuit illustrated in FIG. 8

As illustrated in FIG. 11A, the electric potential of the electric signal E1 varies in the portions P111 and P112. The variation in the electric potential, such as in the portions P111 and P112, causes the difficulty in determination in which the electric potential is higher or lower than a predetermined value. Accordingly, the data corresponding to the portions P111 or P112 may be determined incorrectly.

Figure 11B:
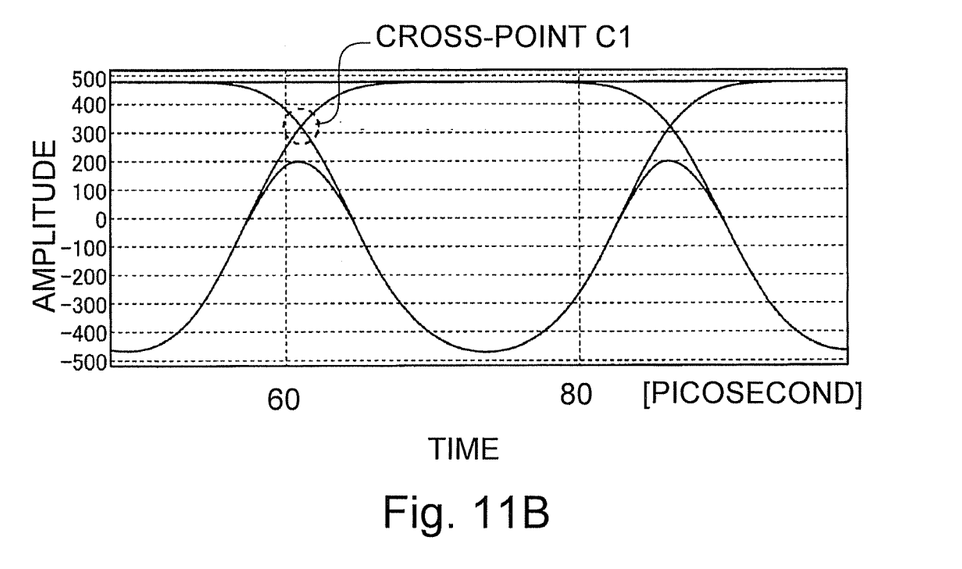
FIG. 11B is a diagram illustrating an example of an eye-pattern of the electric signal illustrating in FIG. 11A.

The eye pattern illustrated in FIG. 11B is distorted because the cross-point C1 circled with a dotted line shifts from the center of the peak-to-peak amplitude of the electric signal outputted from the optical receiving circuit 32. The distortion of the eye pattern results in the difficulty in determination or an erroneous determination of the data. Accordingly, it is found that the electric signal E1 causes the problem in determining the corresponding data. The variation of the electric potential, such as the variations in P111 or P112 illustrated in FIG. 11A, occurring in every change of the phase is referred to as the "phase-potential variation" hereinafter.

Further, the problem described above will be serious in the case of the demodulation in which the data is determined using comparison of DPSK optical signal with an optical signal delayed by 1 bit or smaller bits. That is, a processing of the comparison is easily suffered from the phase-potential variation.

The embodiments below intends to solve the problem described above and provide an optical receiving device, an optical receiving circuit, and method for receiving an optical signal to improve an error rate in a determination of data corresponding the optical signal.

Preferred embodiments will now be described in detail with reference to the accompanying drawings. In the following embodiments is described as an example of an optical receiving device, an optical receiving circuit, or method for receiving an optical signal. The present invention is not limited to the embodiments described below.

The optical receiving device 100 according the first embodiment is described with reference to FIGS. 1 to 4. The optical receiving device 100, which is described in detail later, generates two electric signals. One of the electric signals is an electric signal of which value is a difference between values of a normal and a reverse in phase signals derived in the same manner as the conventional optical receiving circuit, and is referred to as a "data signal." The other of the electric signals is a signal of which value is a sum of the values of the normal and the reverse in phase signals, and is referred to as a "complement signal." Further, the optical receiving device 100 derives a difference between the data and complement signals. The difference is used for suppressing variation in the data signal.

The reason why the variation in the data signal is suppressed with the difference between the data and the complement signals will be explained below. Referring to FIG. 10, a sum of the values of the normal and the reverse in phase optical signals is constant except in the portions P101 and P102. That is, the sum of the values is constant because the two signals except in the portions P101 and P102 are not suffered from the characteristic that the intensity of the optical signal falls at every time the phase changes.

The sum of the values of the normal and the reverse in phase optical signals in the portions P101 and P102 is not constant. That is, the sum of the values is not constant because of the characteristic.

Accordingly, the complement signal generated has a characteristic that the value is fluctuating only in a duration in which both values of the normal in phase and the reverse in phase signals are fluctuating, while the value is constant in a duration in which the both values of the normal in phase and the reverse in phase signals are constant. With use of the difference value between the data signal and the complement signal, the optical receiving device 100 may be able to derive, from the data signal, an electric signal in which the phase potential variation is suppressed.

Figure 1:
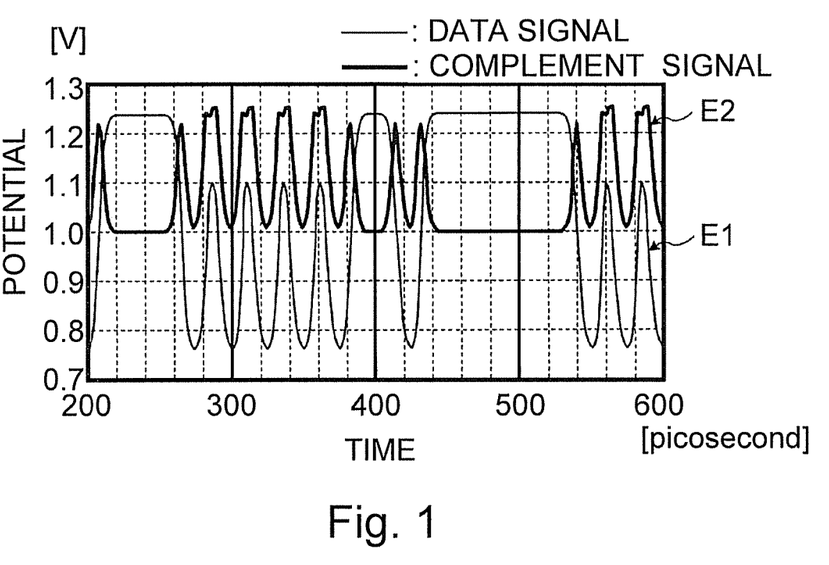
FIG. 1 is a diagram for explaining an optical receiving device according to the first embodiment.

Referring to FIG. 1, the first embodiment will be described in detail. FIG. 1 illustrates an example of a pair of a data signal and a complement signal generated by the optical receiving device 100 according to the first embodiment. First, the method for the optical signal according the first embodiment is explained with use of the data and the complement signals. The data signal E1 is similar to the electric signal E1 illustrates in FIG. 11A. Accordingly, a normal in phase and a reverse in phase optical signals in the first embodiment are used and are similar to individual the normal in phase and the reverse in phase optical signals illustrated in FIG. 10. The complement signal is derived from a sum of electric signals which are converted individually from the normal in phase optical signal and the reverse in phase optical signal. The optical receiving device 100 generates a signal to be difference of the data signal E1 and the complement signal E2 and outputs the signal.

Figure 2A:
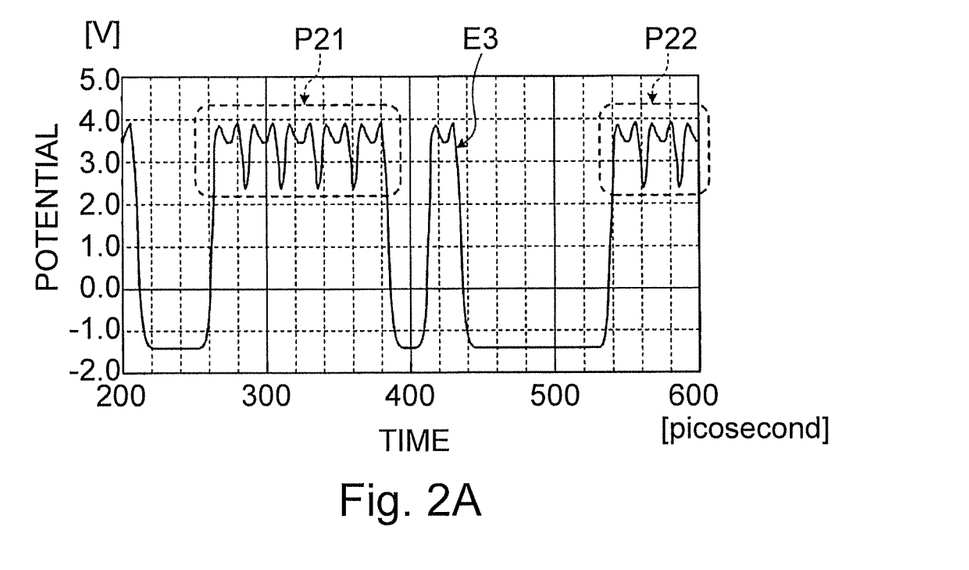
FIG. 2A is a diagram illustrating an example of an electric signal outputted from the optical receiving device according to the first embodiment.

FIG. 2A illustrates an electric signal, as an example, outputted from the optical receiving device 100. The electric signal E3 depicted in FIG. 2A is the electric signal as the difference of the data signal E1 and the complement signal E2. The electric potential in the portion P21 of the electric signal E3 has smaller variation than that of the portion P111 of the electric signal E1 illustrated in FIG. 11A. Similarly, the electric potential in the portion P22 of the electric signal E3 has smaller variation than that of the portion P112 of the electric signal E1. Accordingly, the electric signal E3, a data-identifying device to be connected to the optical receiving device 100 will perform the data determining process more accurately than with the use of the electric signal E1.

Figure 2B:
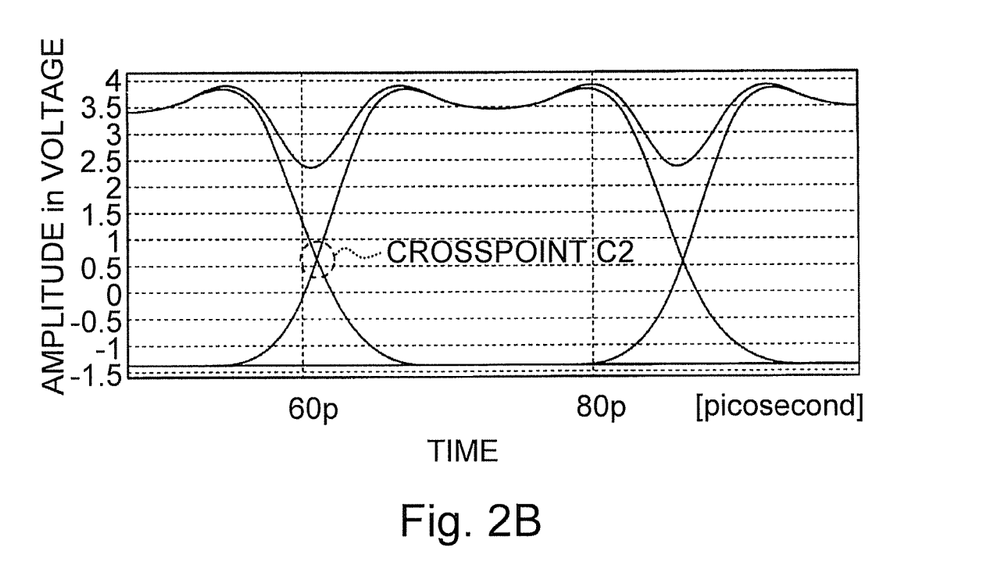
FIG. 2B is a diagram illustrating an example of an eye-pattern of the electric signal.

The eye pattern of the electric signal E3 is illustrated in FIG. 2B. The eye pattern illustrates also that the data-identifying device determines associated with the received DPSK optical signal more accurately with the use of outputs derived by the optical receiving device. The eye pattern of the electric signal E3 has a cross point C2 more close to the center of the peak-to-peak amplitude than that of the eye pattern in illustrated FIG. 11B and the waveform of the eye pattern E3 appears like a wide-open eye. Since the electric signal has the eye pattern having characteristics described above, the data-identifying device will perform the data-identifying process with a high degree of accuracy.

As described above, the optical receiving device 100 generates the data signal and the complement signal, where the data signal and the complement signal are respectively corresponding to a difference and a sum of the normal in phase and the reverse in phase components of the electric signal. Then, the optical receiving device 100 outputs an electric signal as the difference of the data signal and the complement signal, that is, the optical receiving device 100 outputs the electronic signal with suppressed variation of a phase electric potential. As a result, the data-identifying device will performs the data determining process with a high degree of accuracy by using the output signal from the optical receiving device 100.

Figure 3:
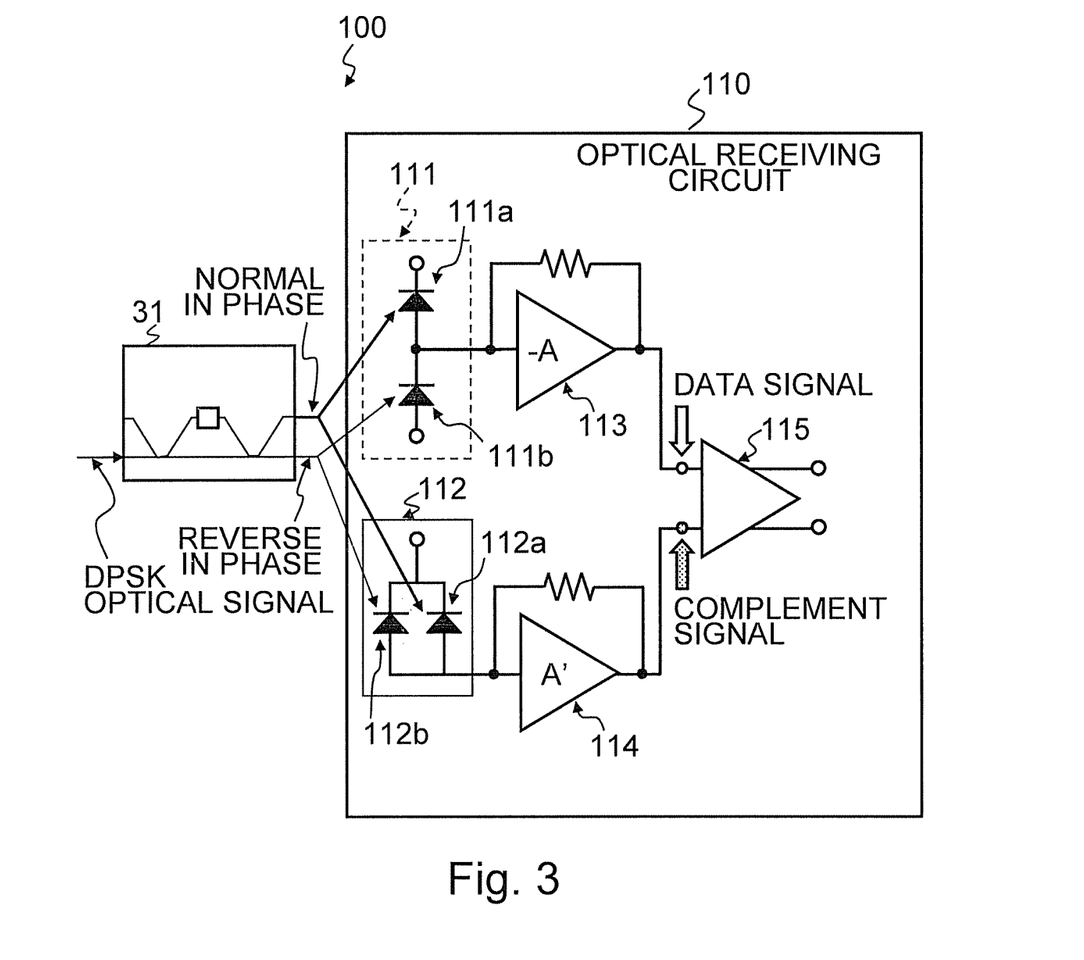
FIG. 3 is a diagram illustrating a configuration of the optical receiving device according to the first embodiment.

The configuration of the optical receiving device 100 is explained with reference to FIG. 3, where the configuration of the optical receiving device 100 is illustrated. The optical receiving device 100 includes a delay interferometer 31 and an optical receiving circuit 110. The delay interferometer 31 is similar to the delay interferometer 31 illustrated in FIG. 8.

The optical receiving circuit 110 includes photo-detector units 111 and 112, and amplifiers 113 to 115. The photo-detector unit 111 includes photo-detectors (PDs) 111a and 111b. The PD 111a converts the normal in phase optical signal, which is inputted from the delay interferometer 31, to the electric signal. In addition, the PD 111b converts the reverse in phase optical signal, which is inputted from the delay interferometer 31, to the electric signal. Further, the photo-detector 111 outputs to the amplifier 113 an electric signal as the difference of the normal in phase electric signal from the PD 111a and the reverse in phase electric signal from the PD 111b.

The photo-detector unit 112 includes photo-detectors (PDs) 112a and 112b. As well as the performance of the PD 111a, PD 112b converts the normal in phase optical signal and the reverse in phase optical signal, which are inputted from the delay interferometer 31, to the electric signals respectively. The PD unit 112 outputs the sum of the normal in phase electric signal and the reverse in phase electric signal, which are individually outputted from the PD 112a and from the PD 112b, to the amplifier 114.

The amplifier 113 receives the electric signal from the PD unit 111 amplifies and output the electric signal to the amplifier 115, where the electric signal amplified by the amplifier 113 is corresponding to the data signal. The gain or the amplification factor of the amplifier 113 is "−A" as depicted in FIG. 3.

Also the amplifier 114 receives the electric signal from the PD unit 112, amplifies and output the electric signal to the amplifier 115. The electric signal amplifier 114 is corresponding to the complement signal. The gain or the amplification factor of the amplifier 113 is A' as depicted in FIG. 3.

The gain such as −A or A' is preferably determined or set according to the amount of variation of the phase electric potential by such as a designer or the like. The individual gain of the amplifier 113 and the amplifier 114 is preferably determined so as to suppress the amount of variation of the phase electric potential in the data signal to within the allowable range.

The amplifier 115 outputs, to the data-identifying device (not illustrated), a signal of the difference between the data signal and the complement signal which are received from the amplifiers 113 and 114 respectively. That is, the amplifier 115 outputs the signal of the difference which is less affected by the variation of the phase potential as the electric signal E3 illustrated the in FIG. 2A.

Figure 4:
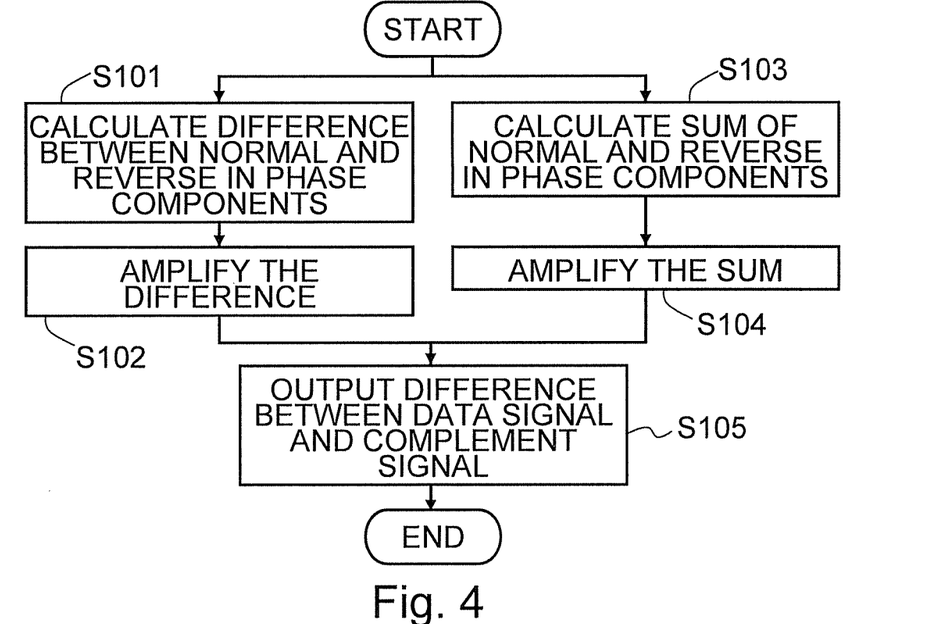
FIG. 4 is a diagram illustrating a flow chart of a process for receiving optical signals by the use of the optical receiving device according to the first embodiment.

Referring to FIG. 4, explained is the flowchart of an optical signal receiving process in the optical receiving device 100 according to the first embodiment. The PD unit 111 of the optical receiving device 100 converts the normal in phase and the reverse in phase signals, which are received from the delay interferometer 31, to each of the electric signals as the normal in phase and the reverse in phase components respectively, and then determines a electric signal as the difference between the electric signals (Step S101). The electric signal as the difference is fed to the amplifier 113.

On receiving the electric signal as the difference, the amplifier 113 amplifies the electric signal as the difference (Step S102). The amplified electric signal as the difference is corresponding to the data signal.

The PD unit 112 converts the normal in phase and the reverse in phase optical signals, which are received from the delay interferometer 31, to each of the electric signals as the normal in phase and the reverse in phase components respectively, and then determines a electric signal as the sum between the electric signals (Step S103). The electric signal as the sum is fed to the amplifier 114.

On receiving the electric signal as the sum, the amplifier 114 amplifies the electric signal as the sum (Step S104). The amplified electric signal as the sum is corresponding to the complement signal. The amplifier 115 derives the difference between the data signal and the complement signal, which are received from the amplifiers 113 and 114 respectively, and feeds the resultant electric signal as the difference. (Step S105).

As described above, the optical receiving device 100 according to the first embodiment generates the data signal and the complement signal as the difference and the sum, respectively, of the normal in phase component and the reverse in phase component of the electric signals. Further, the optical receiving device 100 determines the electric signal as the difference of the data signal and the complement signal, and outputs the electric signal as the difference to such as the data-identifying device (not illustrated in FIG. 3). Since the optical receiving device 100 may suppress the variation of phase potential in the signal using for data identifying, the optical receiving device 100 may provide the high accurate data-identifying process performed by such a data-identifying device (not illustrated in FIGS. 1 to 3).

Next, the second embodiment will be described below. In brief, the first embodiment generates the data signal and the complement signal to derive, by using the difference of the both signals, the electric signal in which the phase potential variation is suppressed. However, it is also preferable to suppress the phase potential variation in the data signal without generating the data signal and the complement signal. Therefore, the optical receiving device 200 according to the second embodiment may suppress the phase potential variation in the data signal without generating the data signal and the complement signal.

First, the method for receiving an optical signal by the optical receiving device 200 is explained. The optical receiving device 200 amplifies the normal in phase and the reverse in phase optical signals by predetermined gains respectively to suppress the phase potential variation appearing in the electric signal using for data identifying. Referring to FIG. 3, the "predetermined gains" will be explained in detail by discussing on the electric signal outputted from the optical receiving device 100.

The signal outputted from the PD unit 111 in the optical receiving device 200 may be represented as follows.

$$Spd1 = Snormal - Sreverse,$$

where

Spd1 is the signal outputted from the PD unit 111,

Snormal is the normal in phase component of the electric signal, and

Sreserve is the reverse in phase component of the electric signal.

Accordingly, the signal outputted from the amplifier 113 is represented as follows.

$$Sout1 = -A \times \{Snormal - Sreverse\}.$$

Further, the PD unit 112 outputs the signal represented as follows.

$$Spd2 = Snormal + Sreverse,$$

where Spd2 is the signal outputted from the PD unit 112. Accordingly, the signal outputted from the amplifier 114 is represented as follows.

$$Sout2 = A' \times \{Snormal + Sreverse\}.$$

Further, since the amplifier 115 outputs the electric signal as the difference of the electric signals outputted from the amplifier 113 and from the amplifier 114, the electric signal outputted from the optical receiving device 100 is represented as following expression 1.

$$S = -A \times \{Snormal - Sreverse\} - A' \times \{Snormal + Sreverse\} \quad (1),$$

where S is the electric signal outputted from the optical receiving device 100.

The expression 1 may be transformed as following expression 2.

$$S = (-A - A') \times Snormal - (-A + A') \times Sreverse \quad (2).$$

The expression 2 indicates that the electric signal outputted from the optical receiving device 100 is derived from the difference of the normal in phase component of the electric signal amplified by the gain (−A−A') and the reverse in phase component of the electric signal amplified by the gain (−A+A').

Figure 5:
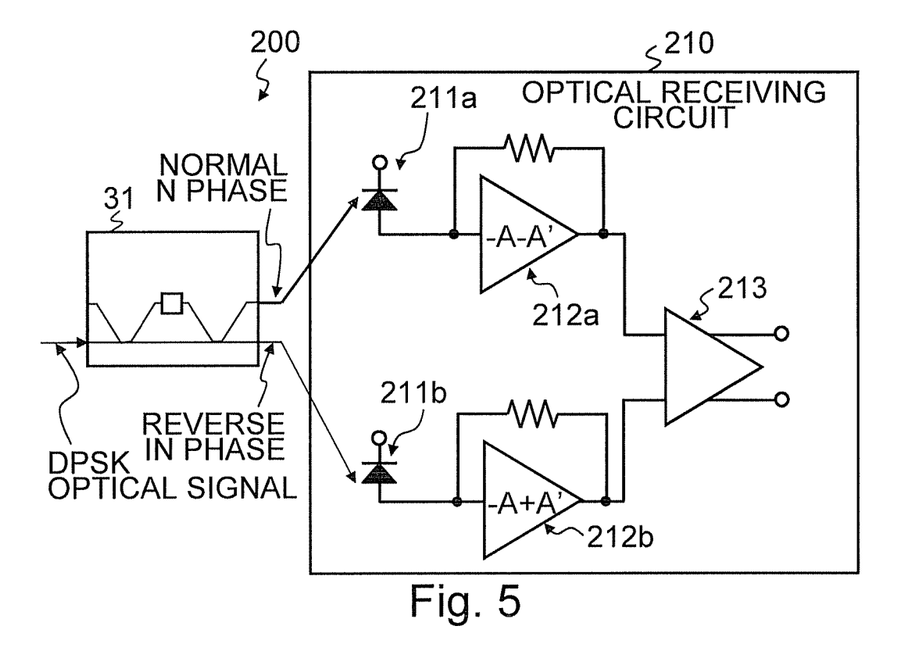
FIG. 5 is a diagram illustrating a configuration of an optical receiving device according to the second embodiment.

Therefore, the optical normal in phase signal and the optical reverse in phase signal from the delay interferometer 31 are converted into each of the corresponding electric signals and are amplified by each of the gains (−A−A') and (−A+A'), where the gains are those of the amplifiers included in the device 200. Setting individually the amplifier gains to (−A−A') and (−A+A'), the optical receiving device 200 may outputs the electric signal substantially equivalent to that of the optical receiving device 100.

Referring to FIG. 5, the configuration of the optical receiving device 200 according to the second embodiment will be described in detail below. The optical receiving device 200 includes a delay interferometer 31, which is similar to the delay interferometer 31 illustrated in FIG. 8, and an optical receiving circuit 210.

The optical receiving circuit 210 includes photo-detectors (PD) 211a and PD 211b, amplifiers 212a and 212b, and an amplifier 213. The PD 211a converts the normal in phase optical signal, which is received from the delay interferometer 31, to an electric signal and feeds the electric signal to an amplifier 212a. The PD 211b converts the reverse in phase optical signal, which is received from the delay interferometer 31, to an electric signal and feeds the electric signal to an amplifier 212b.

The amplifier 212a amplifies the electric signal received from the PD 211a by the gain (−A−A') and feeds the electric signal amplified to the amplifier 213. The amplifier 212b amplifies the electric signal received from the PD 211b by the gain (−A+A') and feeds the electric signal amplified to the amplifier 213. Here, it is assumed that the gains A and A' depicted in FIG. 5 are equivalent to those depicted in FIG. 3 and that the optical receiving device 100 outputs the electric signal of which the phase potential variation is suppressed to a sufficiently small degree.

An amplifier 213 determines or calculates the difference between the electric signals received from the amplifier 212a and from the amplifier 212b, and outputs the electric signal as the difference. That is, the amplifier 213 outputs the electronic signal represented with the expression 2. As the gains are set as described above, the optical receiving device 200 may output the electric signal equivalent to or similar to the electric signal outputted from the optical receiving device 100.

The optical signal receiving process by the optical receiving device 200 will be described bellow, referring to FIG. 6 in which the procedure of receiving the optical signal is illustrated.

Figure 6:
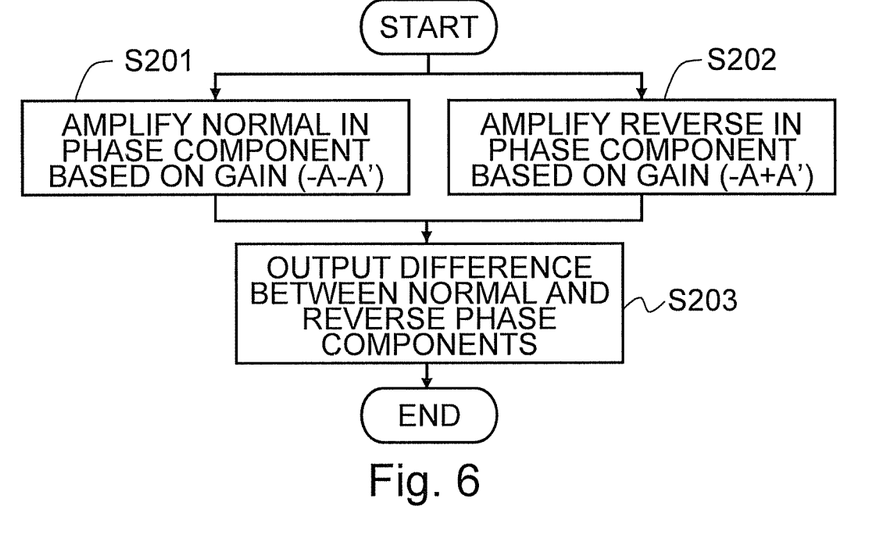
FIG. 6 is a diagram illustrating a flow chart of a process for receiving optical signals by the use of the optical receiving device according to the second embodiment.

As illustrating in FIG. 6, the amplifier 212a amplifies the electric signal (normal in phase electric signal) from the PD 211a by the gain of −A−A' (in S201), where the electric signal is derived by converting the normal in phase optical signal outputted from the delay interferometer 31. In addition, the amplifier 212b amplifies the electric signal (reverse in phase electric signal) from the PD 211b by the gain −A+A' (in S202), where the electric signal is derived by converting the reverse in phase optical signal outputted from the delay interferometer 31.

Subsequently, the amplifier 213 determines or calculates the difference of the electric signals outputted from the amplifiers 212a and 212b, and outputs the electric signal which may be expressed with the expression 2 (S203).

As described above, the optical receiving device 200 according to the second embodiment includes the amplifier 212a for amplifying the normal in phase optical signal and the amplifier 212b for amplifying the reverse in phase optical signal, where both of the normal in phase and the reverse in phase optical signals are outputted from the delay interferometer 31. The gain of the amplifier 212a is set to a value which is equal to the coefficient of the normal in phase component when the electric signal outputted from the optical receiving device 100 is expressed with the terms of the normal in phase and the reverse in phase components. That is the gain of the amplifier 212a is set to (−A−A') in the expression 2.

Similarly, the gain of the amplifier 212*b* is set to a value of the coefficient (−A+A') of the reverse in phase component in the expression 2.

As the gain of each of the amplifier 212*a* and 212*b* is set to the values of (−A−A') and (−A+A') respectively, the optical receiving device 200 may be able to output the electric signal in which the phase potential variation is suppressed as the optical receiving device 100. Accordingly, the accurate processing for identifying or determining the data may be able to be carried on in the data-identifying device, for example, to be connected to the optical receiving device 200. Further, the optical receiving device 200 will be built at a lower cost than that of the optical receiving device 100, because the device 200 needs a smaller number of photo-diodes than that of the optical receiving device 100.

Since the parts or components illustrated in each drawings are explained schematically or from a functional viewpoint, the first and the second embodiments are not necessarily to be built as same as illustrated in the drawings. Further, it is preferable to deploy a plurality of the optical receiving devices 100 or 200 in the form of the distributed or the integrated. Still further, it is preferable to configure an optical receiving device with adequate number of the optical receiving devices 100 or 200 to meet an amount of traffic to be processed or of various types of loads and to meet the usage status of the optical receiving device. In addition, all or a part of the functions for processing in the optical receiving devices 100 and 200 may be performed by the use of a central processing unit (CPU), a computer program executed by the CPU, or a hardware with wired logic.

It is preferable to execute, automatically or manually, all or a part of the processes in the first and the second embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical receiving device for deriving a signal using for data identification comprising:
   a demodulator to demodulate a modulated optical signal to a demodulated optical signal, the modulated optical signal modulated by using a phase modulation scheme;
   a convertor to convert the demodulated optical signal to a first electric signal and a second electric signal, to output a data signal being a difference of the first electric signal of a normal in phase component and the second electric signal of a reverse in phase component;
   a generator to generate a complement signal by summing the first electric signal of the normal in phase component and the second electric signal of the reverse in phase component;
   a suppressor to suppress, based upon the complement signal, a variation of potential, in the data signal, which appears at a time of phase changing of the modulated optical signal.

2. The optical receiving device according to claim 1, wherein the suppressor suppresses the variation by the use of a difference between the data signal and the complement signal.

3. The optical receiving device according to claim 1, wherein the demodulator demodulates the modulated optical signal by comparing the modulated optical signal and a delayed optical signal being delayed behind the modulated optical signal by less than one bit in a phase.

4. The optical receiving device according to claim 1, wherein the suppressor includes an amplifier for amplifying the first electric signal of the normal in phase component and the second electric signal of the reverse in phase component so that a ratio of the first electric signal of the normal in phase component and the second electric signal of the reverse in phase component is equal to a ratio of the normal in phase component and the reverse in phase component of the data signal in which the variation is suppressed.

5. The optical receiving device according to claim 4, wherein the demodulator demodulates the modulated optical signal by comparing the modulated optical signal and a delayed optical signal being delayed behind the modulated optical signal by less than one bit in a phase.

6. An optical receiving circuit for deriving a signal using for data identification comprising:
   a convertor that converts a modulated optical signal modulated by a phase modulation scheme to a first electric signal and a second electric signal, to output a data signal being a difference of the first electric signal of a normal in phase component and the second electric signal of a reverse in phase component;
   a generator that generates a complement signal by summing the first electric signal of the normal in phase component and the second electric signal of the reverse in phase component;
   a suppressor that suppresses, based upon the complement signal, a variation of potential in the data signal which appears at a time of phase changing of the modulated optical signal.

7. The optical receiving circuit according to claim 6, wherein the suppressor suppresses the variation by the use of a difference between the data signal and the complement signal.

8. The optical receiving circuit according to claim 6, wherein the converter converts the modulator optical signal into the electric signal by comparing the modulated optical signal and a delayed optical signal being delayed behind the modulated optical signal by less than one bit in a phase.

9. The optical receiving circuit according to claim 6, wherein the suppressor includes an amplifier for amplifying the first electric of the normal in phase component and the second electric signal of the reverse in phase component so that a ratio of the first electric signal of the normal in phase component and the second electric signal of the reverse in phase component is equal to a ratio of a normal in phase component and a reverse signal component of the data signal in which the variation is suppressed.

10. The optical receiving circuit according to claim 9, wherein the converter converts the modulator optical signal into the electric signal by comparing the modulated optical signal and a delayed optical signal being delayed behind the modulated optical signal by less than one bit in a phase.

11. A method executed by an optical receiving device for a receiving an optical signal modulated by a phase modulation scheme, the method comprising:
   demodulating a modulated optical signal to a demodulated optical signal;

converting the demodulated optical signal to a first electric signal and a second electric signal, to output a data signal being a difference of the first electric signal of a normal in phase component and the second electric signal of a reverse in phase component;

generating a complement signal by summing the first electric signal of the normal in phase component and the second electric signal in the reverse in phase component; and suppressing, based upon the complement signal, a variation of potential in the data signal which appears at a time of phase changing of the modulated optical signal.

12. The method according to claim 11, wherein the suppressing suppresses the variation by the use of a difference between the data signal and the complement signal.

13. The method according to claim 11, wherein the demodulating demodulates the modulated optical signal by comparing the modulated optical signal and a delayed optical signal being delayed behind the modulated optical signal by less than one bit in a phase.

14. The method according to claim 11, wherein the suppressing includes amplifying the first electric signal of the normal in phase component and the second electric signal of the reverse in phase component so that a ratio of the first electric signal of the normal in phase component and the second electric signal of the reverse in phase component is equal to a ratio of a normal in phase component and a reverse signal component of the data signal in which the variation is suppressed.

15. The method according to claim 14, wherein the demodulating demodulates the modulated optical signal wherein the demodulator demodulates the modulated optical signal by comparing the modulated optical signal and a delayed optical signal being delayed behind the modulated optical signal by less than one bit in a phase.

* * * * *

UNITED STATES PATENT AND TRADEMARK OFFICE
CERTIFICATE OF CORRECTION

PATENT NO. : 8,478,138 B2
APPLICATION NO. : 12/623548
DATED : July 2, 2013
INVENTOR(S) : Mariko Sugawara et al.

It is certified that error appears in the above-identified patent and that said Letters Patent is hereby corrected as shown below:

In the Claims

Column 10, Line 51, In Claim 9, delete "electric" and insert -- electric signal --, therefor.

Signed and Sealed this
Fifteenth Day of October, 2013

Teresa Stanek Rea
*Deputy Director of the United States Patent and Trademark Office*